Sept. 30, 1958    M. F. SHEARD    2,854,138
LEVELLING GRAIN SHOES IN HARVESTERS
Filed March 24, 1958    4 Sheets-Sheet 1

INVENTOR.
Marville F. Sheard
BY
Atty.

Sept. 30, 1958   M. F. SHEARD   2,854,138
LEVELLING GRAIN SHOES IN HARVESTERS
Filed March 24, 1958   4 Sheets-Sheet 2
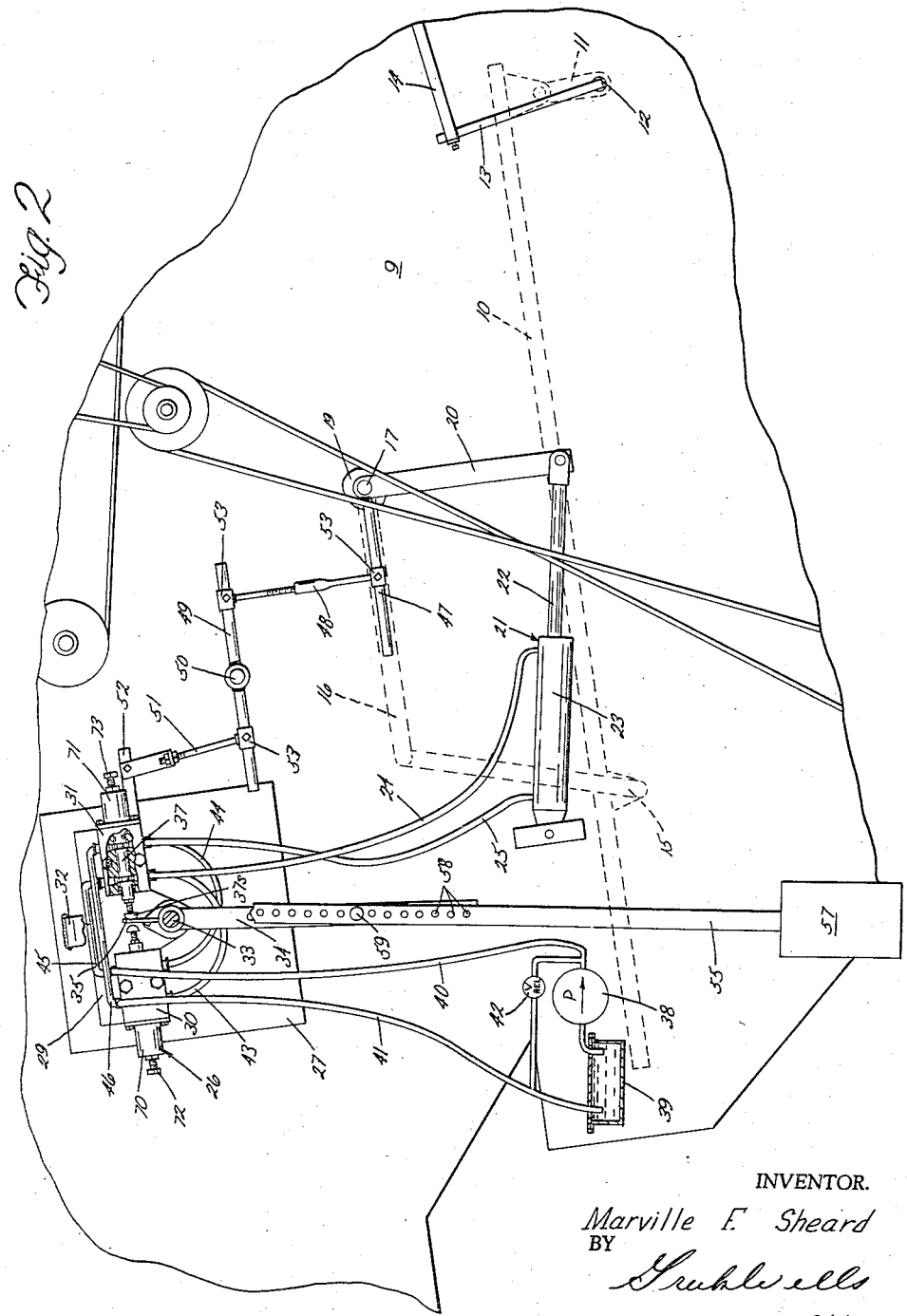
INVENTOR.
Marville F. Sheard
BY
Struhlwells
Atty.

Sept. 30, 1958        M. F. SHEARD                2,854,138
            LEVELLING GRAIN SHOES IN HARVESTERS
Filed March 24, 1958                           4 Sheets-Sheet 3
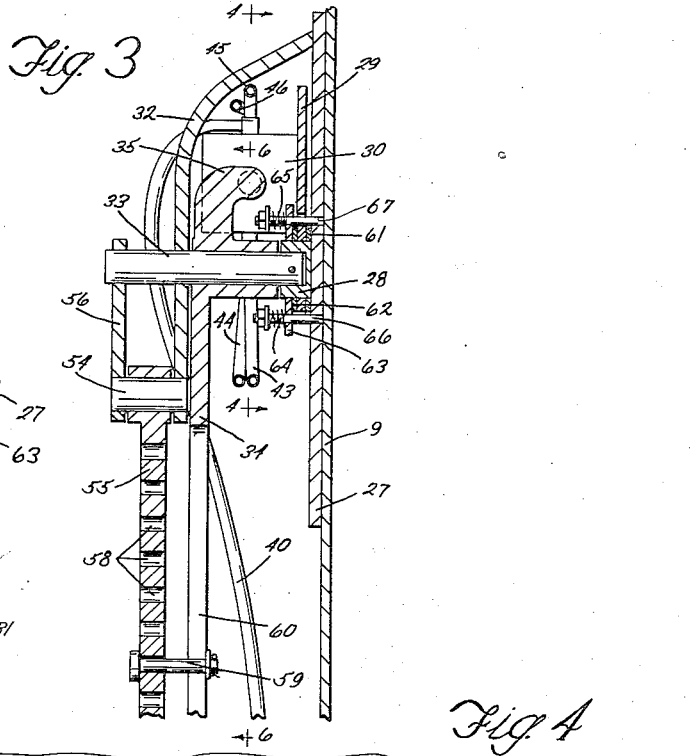
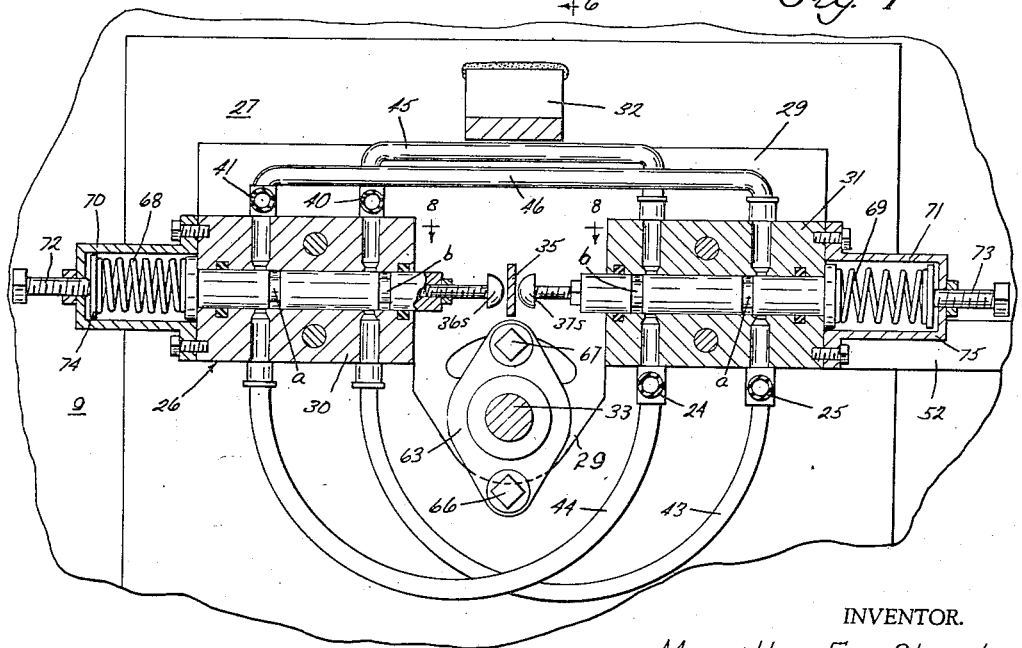
INVENTOR.
Marville F. Sheard
BY
Atty.

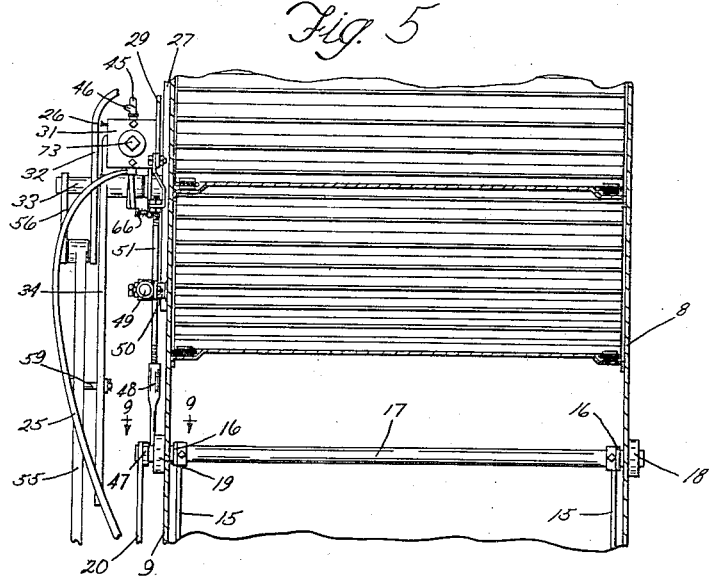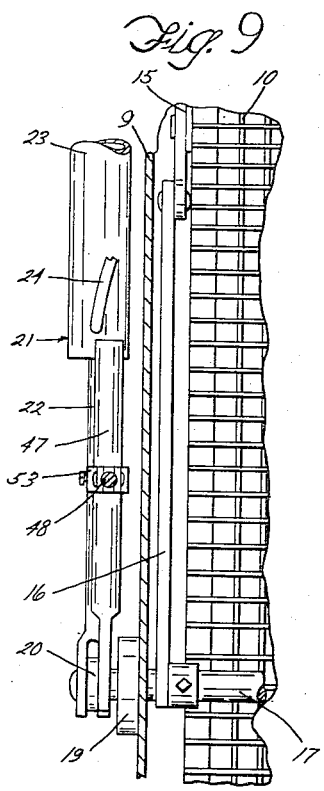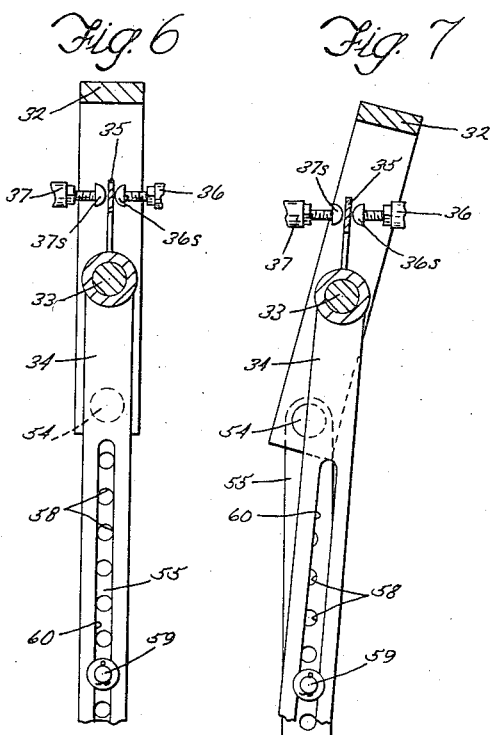

United States Patent Office 2,854,138
Patented Sept. 30, 1958

2,854,138

LEVELLING GRAIN SHOES IN HARVESTERS

Marville F. Sheard, Athena, Oreg.

Application March 24, 1958, Serial No. 723,388

5 Claims. (Cl. 209—416)

My invention relates to levelling grain shoes in harvesters.

It is the principal purpose of my invention to provide a levelling mechanism for grain shoes of harvesters responsive to fore and aft tipping of the harvester to a pendulum to actuate a hydraulic jack and thereby move the grain shoe toward level position and locking the grain shoe hydraulically in the level position.

My invention is embodied in a harvester mechanism wherein a grain cleaning shoe of the type illustrated generally in my prior application, Ser. No. 634,091, filed January 14, 1957, is used. It is common practice in combine harvesters today to provide adequate means to maintain the harvester body upright with respect to sidewise tipping of the land. Adequate compensation for fore and aft tipping has not been, to my knowledge, provided and this tipping causes serious losses in grain and in the efficiency of the machine. When the harvester is climbing a hill, the grain shoe, unless levelled, will tend to spill grain over the back because the grain is being speeded across the grain shoe too fast by the incline of the grain shoe, the shaking of the grain shoe and the air flow created by the fan beneath the grain shoe. When the machine is going down hill the grain shoe, unless levelled, tends to choke up because the shaking operation is not sufficient to keep the grain moving up the incline. It is not new to utilize fore and aft levelling mechanism for grain shoes, but they have not been particularly successful in solving the problem.

Specifically it is the purpose of my invention to provide a fore and aft leveller for the grain shoe screen wherein a valve unit is pivoted to the harvester body and interconnected by links and levers with the grain shoe so as to maintain the same position, preferably a parallel one, with respect to the grain shoe as the body tips, and to operate a hydraulic jack under control of said valve unit by means of a pendulum pivoted on the harvester body and a tip compensating mechanism between the pendulum and the valve unit so as to correct the level of the grain shoe screen in response to tipping of the body of the harvester.

The nature and advantages of my invention will be more apparent from the following description and the accompanying drawings illustrating a preferred form of the invention. The drawings and description are illustrative only, however, and are not intended to limit the invention except insofar as it is limited by the claims.

In the drawings:

Figure 2 is a view similar to Figure 1, but illustrating the tipping of the body before it has corrected the level of the grain shoe;

Figure 3 is a sectional view on an enlarged scale taken substantially on the line 3—3 of Figure 1;

Figure 4 is an enlarged sectional view taken on the line 4—4 of Figure 3;

Figure 5 is a fragmentary sectional view taken on the line 5—5 of Figure 1;

Figure 6 is a fragmentary sectional view taken on the line 6—6 of Figure 3;

Figure 7 is a view like Figure 6, showing the parts in changed position;

Figure 8 is a fragmentary sectional view taken on the line 8—8 of Figure 4; and

Figure 9 is an enlarged fragmentary sectional view taken on the line 9—9 of Figure 5.

Figure 1:
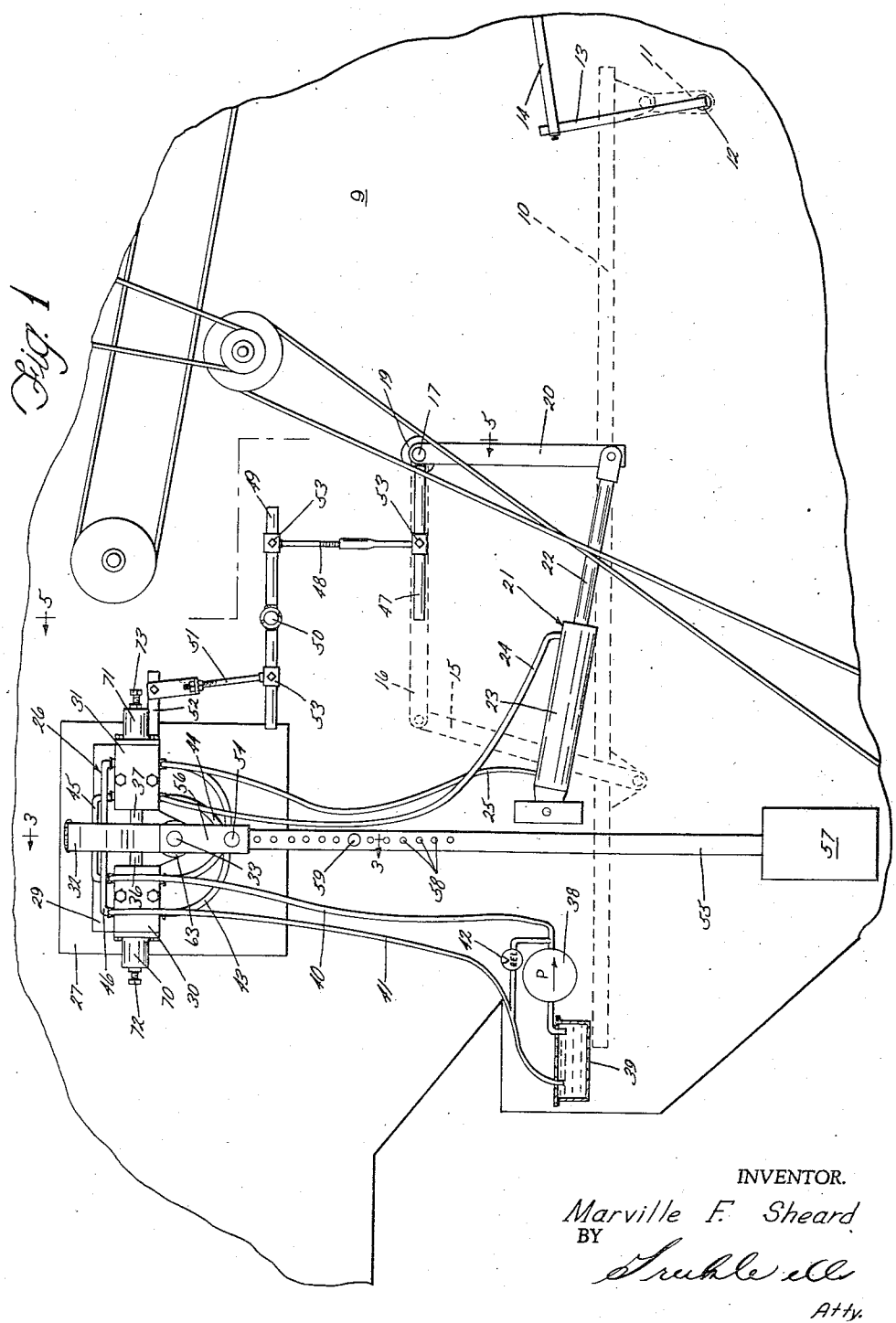
Figure 1 is a side view of a portion of the body of a harvester showing my invention as applied thereto.

Referring now to the drawings, I have illustrated in Figures 1 and 5, a portion of a harvester with the grain screen or shoe 10 shown in dotted lines in Figure 1. This shoe is supported at one end and shaken by rocker arms 11 on a shaft 12 that is oscillated by an arm 13 which is actuated by a link 14 and an eccentric drive (not shown). The details of the mechanism for oscillating the shoe 10 are known. They are illustrated in my U. S. Patent application Ser. No. 634,091, filed January 14, 1957, for Grain Separator. The rear portion of the shoe 10 is suspended upon links 15 that are connected to arms 16 which in turn are fixed on a cross shaft 17 that is journalled in bearings 18 and 19 in the side walls 8 and 9 of the harvester. The shoe 10 is raised and lowered about its front support arms 11 by turning the cross shaft 17. My invention is directed to a means for raising and lowering the shoe about its front support, with respect to the harvester body, as the body is tilted by going down hill or up hill, so as to maintain the shoe 10 in the most desirable relation to a horizontal line in the direction of travel of the harvester.

The means to turn the cross shaft 17 comprises an arm 20 fixed to the shaft 17 and a hydraulic jack 21 which has its piston rod 22 pivotally connected to the arm 20 and its cylinder 23 pivoted to the side wall 9 of the harvester body. Two flexible fluid conduits 24 and 25 are provided to conduct hydraulic fluid to and from the ends of the cylinder 23.

The flow of hydraulic fluid in the conduits 24 and 25 is controlled by a valve unit 26 that is pivotally mounted on the side wall 9. A plate 27 is mounted on the side wall 9. This plate has a member 28 thereon that pivotally supports a base 29 of the valve unit 26. Two valve casings 30 and 31 are fixed on the base 29. The base 29 and a bracket 32 support a stub axle 33. The axle 33 provides a pivotal mounting for a valve actuating lever 34 which carries a finger 35. The finger 35 actuates two sliding valves 36 and 37 in the valve casings 30 and 31. These valves control the supply of hydraulic fluid from a pump 38 on the wall 9 through a conduit 40, the casings 30 and 31 to the cylinder 23 and back through a conduit 41 to a supply reservoir 39 mounted on the wall 9.

In the position shown in Figure 4, the two valves close all of their ports so that the pump 38 merely pumps fluid through the pressure relief valve 42 back into the reservoir 39. If the valve 36 is moved to the left from the position shown in Figure 4 until the grooves *a* and *b* are opened to the corresponding ports in the valve casing 30, then fluid will flow from the conduit 40 through the right hand top port of the valve casing 30, the groove *b* of the valve 36, the bottom right hand port of the valve casing 30, then through a connecting conduit 43 to the conduit 25 and the left hand end of the cylinder 23. The valve 36 in this new position also connects the conduit 24 to the reservoir 39 through a connecting conduit 44, the lower left hand port of the valve casing 30, the groove *a* of the valve 36, the upper left hand port of the valve 30 and the conduit 41. Thus fluid would be supplied to the left hand end of the cylinder 23 and forced out of the right hand end of the cylinder 23 through the valve 30 to the reservoir 39. If the valve 37 is pushed to the right from the position shown in Figure 4, the conduit 40 will be connected through a connecting conduit 45, the left hand ports of the valve casing 31 and the groove $b$ of the valve 37 to the conduit 24 and the conduit 25 will be connected to the conduit 41 through the right hand ports of the valve casing 31, the groove $a$ of the valve 37 and a connecting conduit 46.

The valve unit 26 is connected to the shoe 10 so as to move on its pivot whenever the shoe is raised or lowered by turning the shaft 17. The means for causing the valve unit 26 to follow the movement of the shoe 10 comprises a linkage between the shaft 17 and the valve unit base 29. This linkage is made up of a lower arm 47 fixed to the shaft 17 and the arm 20, a link 48, a lever 49 pivoted on a stub shaft 50 that is mounted on the side wall 9, a link 51, and an arm 52 fixed on the valve unit 26. The links 48 and 51 are both adjustable in length and the ends of the links are pivoted to members 53 that can be adjusted lengthwise on the respective arms and lever. It is preferable generally to so adjust the links and their connections to the arms 47 and 52 and the lever 49 that the valve unit remains substantially parallel to the shoe 10.

Pendulum control is utilized to move the valves 36 and 37 to open position. This control mechanism is best illustrated by Figures 2, 3 and 6. The bracket 32 extends down below the shaft 33 and carries a pivot pin 54 on which a pendulum arm 55 is pivoted. The pin 54 is braced by a bar 56 extending down from the shaft 33. A weight 57 is provided on the arm 55. The arm 55 has a plurality of apertures 58 therein to receive a pin 59 that passes through a slot 60 in the valve actuating lever 34 to cause the lever 34 to turn on the shaft 33 when the pendulum arm 55 turns on the pin 54. The angular motion given the arm 34 for a particular angular movement of the pendulum arm 55 depends upon the position of the pin 59. However the angular movement of the arm 34 is always less than the angular movement of the arm 55.

In operation (see Figure 2), when the harvester body tilts up at the front as in climbing a slope, the bracket 32, being fixed to the body, is no longer vertical and the pivot pin 54 is moved slightly forward with respect to the shaft 33. The pendulum swings rearward and this in turn swings the lower end of the arm 34 rearward a lesser amount to contact the finger 35 with the adjustable stop 37$s$ on the valve 37. The valve 37 is thus moved to open position and fluid is supplied through the conduit 24 to the right hand end of the cylinder 23 of the jack 21 to shorten the jack 21 and pull the arm 20 to the left or rearwardly. This movement rocks the shaft 17 to raise the rear end of the shoe 10. It also raises the arm 47 to in turn lower the front end of the valve unit 26 to keep it in substantially the same relation (preferably parallel) with the shoe 10. The movement of the valve unit is in a direction to separate the stop 37$s$ from the finger 35. As soon as the stop 37$s$ is permitted to return to valve closed position, the conduits 24 and 25 are both closed at the valve unit 26 and the shoe 10 is locked in its new position. So is the valve unit 26. They remain so locked until the fore and aft tipping of the harvester changes enough to make the pendulum operate one of the valves 36 or 37 again. The stops 36$s$ and 37$s$ of the valves 36 and 37 can be set fairly close to the finger 35 and maintain close response to the pendulum movement. It is to be noted, however, that the compensation provided by the pendulum arm 55 to lever arm 34 connection and that provided by the linkage between the valve unit 26 and the shoe moving arm 20 both serve to prevent a valve open too long and thus over correcting the position of the shoe.

In oder to dampen movement in the valve-shoe assembly that might result from tendency of the pendulum to keep swinging and other vibrations, I provide a frictional drag on the valve unit 26 that can be adjusted to dampen its oscillation on its pivot 28. This drag comprises fiber disks 61 and 62 on both sides of the base 29 around the pivot member 28. These fiber disks are yieldingly clamped against the base member 29 by a metal plate 63 and springs 64 and 65 on bolts 66 and 67. The base member 29 is, of course, slotted to pass the bolt 67, as it turns.

The valves 36 and 37 are spring pressed into closed position by springs 68 and 69 respectively. These springs are housed in shells 70 and 71 that are mounted on the valve casings 30 and 31 respectively. The pressure of the springs 68 and 69 can be adjusted by screws 72 and 73 bearing on spring followers 74 and 75.

It is believed that the nature and advantages of my invention will be understood from the foregoing description. With the levelling mechanism just described the fore and aft levelling of the grain shoe 10 is made automatically responsive to the fore and aft tipping of the harvester body. It is also possible to pre-set the levelling mechanism so that the shoe is set to slope up or down with respect to the horizontal from front to back to select the best operating position of the grain shoe for the existing harvesting conditions. If the grain is being blown over the shoe, the linkage between the arms 47 and 52 can be adjusted to make the valve unit 26 level when the rear end of the shoe 10 is raised slightly above the front of the shoe so as to retard the flow of grain along the shoe. The sensitivity of the valve mechanism to pendulum movement is adjusted by the connection of the pin 59 up and down on the pendulum arm 55 and by the stops 36$s$ and 37$s$. The grain shoe is locked against up and down movement with respect to the harvester body except when its level is being changed because the valves 36 and 37 close off the conduits 24 and 25 except when one of the valves is opened.

Having described my invention, I claim:

1. In a harvester body having a grain shoe supported therein and extending lengthwise thereof, means for causing proper endwise levelling of the shoe in response to endwise tipping of the harvester body, comprising lift arms pivoted in said body and connected to the shoe operable to lift one end of the shoe with respect to the other and thus move the shoe angularly relative to the body, a valve unit pivoted on a side wall of the harvester body, a series of links and lever arms interconnecting the valve unit with the shoe lift arms and operable to move the valve unit angularly on its pivot substantially the same amount as the shoe is moved angularly on the harvester body so that the position of the valve unit reflects the position of the grain shoe, a hydraulic jack controlled by said valve unit and connected to said lift arms, and a pendulum suspended on said body and controlling said valve unit.

2. In a harvester body having a grain shoe supported therein and extending lengthwise thereof, means for causing endwise levelling of the shoe in response to endwise tipping of the harvester body comprising lift arms pivoted in said body and connected to the shoe to lift one end of the shoe with respect to the other and thus move the shoe angularly with respect to the body, a valve unit pivotally supported on one side of the body and having an arm fixed thereto extending lengthwise of the body, means interconnecting said last named arm and the lift arms operable to move the valve unit angularly on its pivot, when the shoe is moved angularly with respect to the body, an amount substantially equal to the angular movement of the shoe, a pendulum supported on said side wall on an axis spaced from the pivotal axis of said valve unit, a hydraulic jack on said side wall operably connected to said lift arms to raise and lower them, a reservoir and a pump on said body for supplying fluid under pressure, valves forming part of said valve unit controlling fluid flow to and from the hydraulic jack, valve actuating means on said valve unit and connecting mechanism between said last named means and the pendulum for operating the valve actuating means.

3. The invention defined in claim 2 wherein the means interconnecting the lift arms with the arm on the valve unit is adjustable to change the angular position of the valve unit relative to the body, while the relative angular movement of the valve unit and shoe remain substantially unchanged.

4. The invention defined in claim 3 wherein friction means is interposed between the valve unit and body, yieldingly to oppose pivotal movement of the valve unit.

5. Means to maintain a predetermined position of the grain shoe in a harvester body with respect to a horizontal line in the direction of travel of the harvester body when the harvester is inclined with respect to said horizontal line, said means comprising a pivotal support mounted in the harvester body for said shoe to rock up and down with respect to the harvester body, support links spaced lengthwise of the harvester from the pivotal support and connected to the shoe, a rock shaft extending across the harvester body and journalled thereon, arms fixed on said shaft and carrying the support links, a valve unit pivoted on the harvester body, a series of links and lever arms connecting the valve unit to said shaft operable to maintain the valve unit substantially in a fixed relation to a line parallel to the grain shoe, a pendulum suspended from the harvester body, a hydraulic jack connected to said shaft, a source of fluid under pressure connected through said valve unit to the jack and operable by said valve unit to cause the jack to turn the shaft in either direction for raising or lowering the grain shoe about its pivotal support, the valve unit being operated by said pendulum to determine the direction and extent of turning movement the jack gives to said shaft.

References Cited in the file of this patent
UNITED STATES PATENTS

| | | |
|---|---|---|
| 894,439 | Hovland | July 28, 1908 |
| 2,831,577 | Farber | Apr. 22, 1958 |